July 28, 1942.                E. R. FUCHS                2,291,575
BOMB SIGHT
Filed Feb. 6, 1941                           2 Sheets-Sheet 1
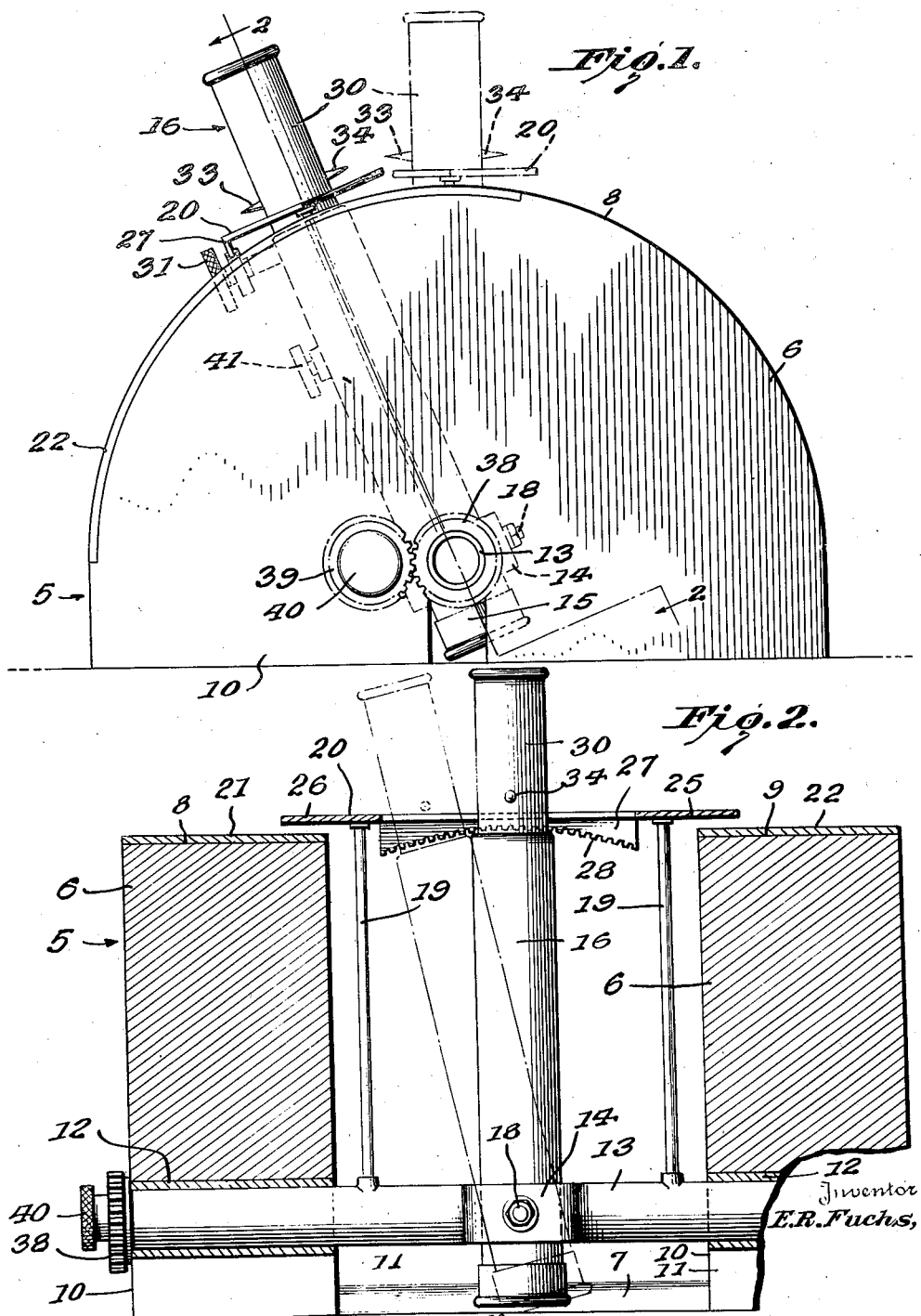
Inventor
E. R. Fuchs,
By McMorrow & Berman
Attorneys July 28, 1942.  E. R. FUCHS  2,291,575
BOMB SIGHT
Filed Feb. 6, 1941  2 Sheets-Sheet 2
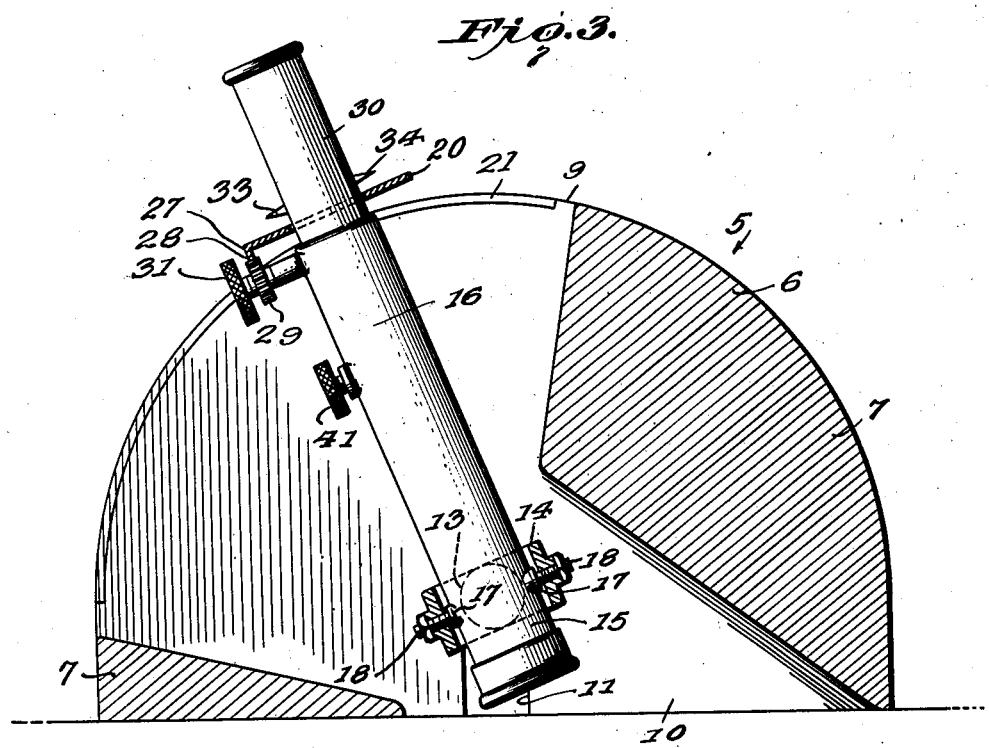
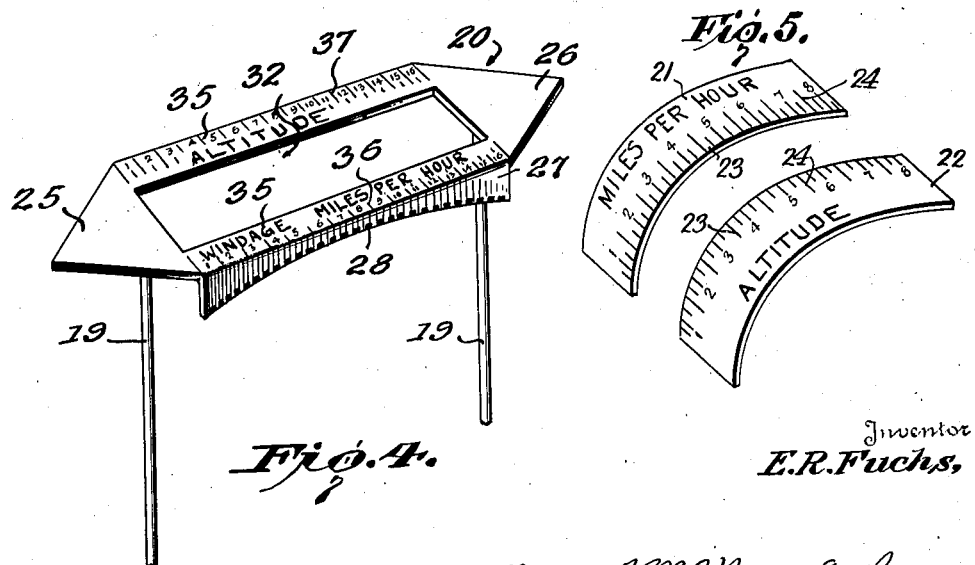
Inventor
E. R. Fuchs Patented July 28, 1942

2,291,575

UNITED STATES PATENT OFFICE 2,291,575

BOMB SIGHT

Earl R. Fuchs, Rome, Ind.

Application February 6, 1941, Serial No. 377,753

10 Claims. (Cl. 33—46.5)

My invention relates to bomb or aerial projectile sights and has as one of the principal objects thereof the provision of a sight or device so constructed and arranged whereby aerial torpedoes, bombs or other similar projectiles may be accurately dropped from a combat aircraft in a manner to strike a desired locality.

An important object of my invention is to provide a device of the character described which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a side elevation of my invention.

Figure 2 is a sectional view taken on the line 2—2 of Fig. 1.

Figure 3 is a vertical longitudinal sectional view of my invention.

Figure 4 is a perspective view of one of the scale plates.

Figure 5 is a perspective view of parallel scale plates.

In practising my invention, as illustrated in the drawings, I provide a scope mount 5 comprising a one-piece body fashioned with a pair of laterally disposed semi-cylindriform sections or members 6 connected together in spatiality by interjacent transverse front and rear sections 7 and with the members 6 having dextral and sinistral arciform faces 8 and 9 respectively extending from front to rear of said members and defining base portions 10 therebetween. Intermediate their front and rear ends, the base portions 10 are formed with recesses 11 in which are secured bearings 12 having rotatably mounted therein the ends of a transverse shaft 13.

The shaft 13, between the members 6 and the sections 7, is formed with a yoke 14 through which is disposed the lower end 15 of an upwardly extending scope 16, the latter being provided at its lower end with bearings 17 receiving therein the inner ends of pivot screws or trunnions 18 carried by the side arms 19 of the yoke 14 whereby to permit lateral pivoting of said scope. Adjacent the yoke 14, the shaft 13 has fixed thereto the lower ends of a pair of upwardly extending rods 19 having their axes disposed in parallelism with the axis of the scope 16. The upper ends of the rods 19 are fixed to the under face of a scale plate 20 disposed over the faces 8 and 9 of the members 6.

The faces 8 and 9, of the members 6, have fixed thereon arciform scale plates 21 and 22 respectively and said plates 21 and 22, adjacent the oppositely disposed sides of the members 6, are provided with scale areas 23 respectively. Said scale areas 23 are provided with indicia 24 indicative of miles per hour of travel and of altitude respectively of a combat aircraft on which my invention is mounted. The scale plate 20 is of an elongated configuration and is formed at its ends with outwardly converging sides defining oppositely extending pointers 25 and 26 disposed over and in close proximity with the scale areas 23 of the plates 21 and 22 respectively for coaction with their respective indicia.

The rear edge of the plate 20, between the pointers 25 and 26, is formed with a depending lip 27 terminating in an arcuate rack 28 meshing with a pinion 29 rotatably mounted on the adjacent face of the upper end 30 of the scope 16 subjacent of the plate 20. The rack 28 extends in parallelism with the axis of the shaft 13 whereby to effect laterally pivoting of the scope 16 upon rotation of the pinion 29, the latter being provided with a finger-piece 31 to facilitate said rotation. The plate 20 is formed with a lengthwise disposed elongated slot 32 through which extends the upper end 30 of the scope 16 and with the latter provided, superjacent said plate 20, with oppositely disposed pointers 33 and 34 respectively. The sides of the plate 20, defining the slot 32, constitute scale areas 35 provided with indicia 36 and 37 denoting altitude and windage in miles per hour respectively and which indicia coact with the pointers 33 and 34.

One end of the shaft 13 has mounted thereon a gear 38 meshing with a pinion 39 rotatably carried by one of the base portions and with said pinion provided with a finger-piece 40 for effecting its rotation. Obviously, rotation of the pinion 39 actuates the shaft 13 and thus adjusts the upper end of the scope 16 and plate 20 towards or from the front of the members 6 and with respect to the plates 21 and 22.

The scope 16 is of the telescopic type wherein the upper and lower ends are relatively adjustable by means of a set screw 41 and the lower end of the scope is provided with the usual crosshairs (not shown) for effecting centralization of an object in the center thereof.

In order to calibrate the scale plates 20, 21 and 22, the instrument or device is mounted on the type of aircraft on which the device will be used in connection with the dropping of a specific type of projectile, it being understood that the aircraft is provided with the usual navigating instruments for ascertaining the speed and direction of travel, windage and altitude. The aircraft is also provided with the projectile or a "dummy" type thereof and is flown over a course at a certain altitude and speed and with substantially zero windage. When the locality on which it is desired to drop the projectile becomes centered within the scope, the projectile is released and its hit position on the locality is noted by indicating the positions of the pointers 25, 26, 33 and 34 on the respective areas of the plates 20, 21 and 22.

The foregoing operation is repeated several times with the plane being flown under varying conditions with respect to speed, altitude and windage but always equipped with the same type of projectile with the result that a number of points are denoted on the respective scale areas and which points constitute known factors by which the scale areas are properly calibrated. From the foregoing it will be apparent that the scope may be adjusted with respect to the scale plates 20, 21 and 22 to enable an operator to release the projectile for hitting a desired locality when the latter becomes centered within the scope. It is to be understood that another scope is mounted on the aircraft in order to direct the pilot in a general direction to bring the objective locality within the broad range of the scope 16. It is also to be understood that the plates 20, 21 and 22 may be substituted for other plates calibrated for use in connection with different types of aircraft and/or projectiles.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. In a device of the character described, a mount having a pair of semi-cylindriform members connected in spatiality, a shaft disposed axially through said members and rotatably connected thereto, a scope pivotally connected to said shaft for movement laterally between said members and rotatable with said shaft between said members, a pair of scale plates fixed to the peripheral faces of said members respectively, said scale plates provided with indicia for denoting the speed and altitude respective of an aircraft, a scale plate fixed to said shaft and having indicia denoting wind drift and altitude respectively of said aircraft, means carried by said scope and coacting with said last mentioned plate to enable said scope to be adjusted in accordance with wind drift and altitude, said pair of scale plates coacting with said last mentioned scale plate to enable said scope to be adjusted with respect to speed and altitude.

2. In a device of the character described, a mount, a shaft rotatably carried by said mount, a scope pivotally connected to said shaft for movement relative to said shaft in one direction and with said shaft in another direction, a pair of scale plates carried by said mount for denoting the speed and altitude respectively of an aircraft, a single scale plate fixed to said shaft and denoting wind drift and altitude of said aircraft, means carried by said scope and coacting with said single scale plate to enable said scope to be adjusted in accordance with wind drift and altitude, said single scale plate movable by the shaft and relative to said pair of scale plates enables said scope to be adjusted with respect to speed and altitude, means for effecting adjustment of said scope with respect to said single scale plate.

3. In a device of the character described, a mount having a pair of semi-cylindriform members connected in spatiality, a shaft disposed axially through said members and rotatably connected thereto, a scope pivotally connected to said shaft for movement laterally between said members about an axis normal to said shaft and rotatable with said shaft between said members, a pair of scale plates fixed to the peripheral faces of said members respectively, said pair of scale plates provided with indicia for denoting the speed and altitude respective of an aircraft, a single scale plate fixed to said shaft and having indicia denoting wind drift and altitude respectively of said aircraft, means carried by said scope and for movement over said single scale plate to enable said scope to be adjusted laterally in accordance with wind drift and altitude, said single scale plate movable by the shaft and having pointers movable over said pair of scale plates respectively enables said scope to be adjusted for speed and altitude of the carrying shaft, means for effecting adjustment of said scope with respect to said single scale plate, means for manually rotating the shaft to adjust said single scale plate and scope with respect to said pair of scale plates.

4. In a bomb sight, a mount, parallel scale plates fixed on said mount and one having speed denoting indicia and the other having altitude denoting indicia, a shaft rotatably carried by said mount, a scale plate secured to said shaft and movable thereby in relation to said parallel scale plates and having indicia denoting wind drift and altitude, and a scope pivotally connected to said shaft for movement in relation to the latter-named scale plate and movable with said shaft and relative to said parallel scale plates.

5. In a bomb sight, a mount, parallel spaced scale plates fixed on said mount and one having speed denoting indicia and the other having altitude denoting indicia, a shaft journaled in said mount and arranged transversely of said scale plates, a slotted scale plate secured to said shaft and movable in relation to said parallel scale plates by said shaft and having indicia denoting wind drift and altitude, a scope extending freely through the slotted scale plate and movable relative thereto and movable with said slotted scale plate and pivoted on said shaft for movement therewith and in relation to the parallel spaced scale plates.

6. In a bomb sight, a mount, parallel spaced scale plates fixed on said mount and one having speed denoting indicia and the other having altitude denoting indicia, a shaft journaled in said mount and arranged transversely of said scale plates, a slotted scale plate secured to said shaft and movable in relation to said parallel scale plates by said shaft and having indicia denoting wind drift and altitude, a scope extending freely through the slotted scale plate and movable relative thereto and movable with said slotted scale plate and pivoted on said shaft for movement therewith and in relation to the parallel spaced scale plates, and means for moving said scope in relation to the slotted scale plate.

7. In a bomb sight, a mount, parallel spaced scale plates fixed on said mount and one having speed denoting indicia and the other having altitude denoting indicia, a shaft journaled in said mount and arranged transversely of said scale plates, a slotted scale plate secured to said shaft and movable in relation to said parallel scale plates by said shaft and having indicia denoting wind drift and altitude, a scope extending freely through the slotted scale plate and movable relative thereto and movable with said slotted scale plate and pivoted on said shaft for movement therewith and in relation to the parallel spaced scale plates, means for moving said scope in relation to the slotted scale plate, and pointers on said scope and extending over the indicia of the slotted scale plate.

8. In a bomb sight, a mount, parallel spaced scale plates fixed on said mount and one having speed denoting indicia and the other having altitude denoting indicia, a shaft journaled in said mount and arranged transversely of said scale plates, a slotted scale plate secured to said shaft and movable in relation to said parallel scale plates by said shaft and having indicia denoting wind drift and altitude, a scope extending freely through the slotted scale plate and movable relative thereto and movable with said slotted scale plate and pivoted on said shaft for movement therewith and in relation to the parallel spaced scale plates, means for moving said scope in relation to the slotted scale plate, pointers on said scope and extending over the indicia of the slotted scale plate, and said slotted scale plate having reduced ends forming pointers extending over the indicia of the parallel spaced scale plates.

9 In a bomb sight, a mount, parallel spaced scale plates fixed on said mount and one having speed denoting indicia and the other having altitude denoting indicia, a shaft journaled in said mount and arranged transversely of said scale plates, a slotted scale plate secured to said shaft and movable in relation to said parallel scale plates by said shaft and having indicia denoting wind drift and altitude, a scope extending freely through the slotted scale plate and movable relative thereto and movable with said slotted scale plate and pivoted on said shaft for movement therewith and in relation to the parallel spaced scale plates, rack teeth formed on the slotted scale plate, and a manually operated pinion journaled on the scope and meshing with the rack teeth for moving said scope in relation to the slotted scale plate.

10. In a bomb sight, a mount having an arcuately curved wall and a slot extending through said wall, parallel scale plates secured on and conforming to said wall and located at opposite sides of the slot and one of said scale plates having speed denoting indicia and the other scale plate having altitude denoting indicia, a shaft journaled in the mount and traversing the slot and the scale plates, a slotted scale plate secured to said shaft and movable thereby in relation to said parallel scale plates and having indicia denoting wind drift and altitude, a scope extending through the slotted scale plate into said slot and movable with the slotted scale plate and movable relative thereto and relative to the parallel scale plates, pointers on said scope and on said slotted scale plate, and means pivoting said scope to the shaft for movement therewith and for pivotal movement relative thereto.

EARL R. FUCHS.